United States Patent [19]

Kindlmann

[11] 4,164,926

[45] Aug. 21, 1979

[54] ELECTRONIC IGNITION ADVANCE CIRCUIT

[75] Inventor: Peter J. Kindlmann, Northford, Conn.

[73] Assignee: The Echlin Manufacturing Company, Branford, Conn.

[21] Appl. No.: 749,666

[22] Filed: Dec. 13, 1976

[51] Int. Cl.² .............................................. F02P 1/00
[52] U.S. Cl. ................................................ 123/148 E
[58] Field of Search ..................... 123/148 E, 117 R; 315/209 T; 307/290, 309

[56] References Cited

U.S. PATENT DOCUMENTS

| 3,297,009 | 1/1967 | Sasaki et al. | 307/309 |
| 3,596,114 | 7/1971 | Maupin et al. | 307/290 |
| 3,671,767 | 6/1972 | Davis | 307/309 |
| 3,776,606 | 12/1973 | Emerson | 307/309 |
| 3,831,570 | 8/1974 | Compton et al. | 123/148 E |
| 3,882,835 | 5/1975 | Randriamanentena | 123/148 E |
| 3,885,534 | 5/1975 | Webster | 123/117 R |
| 3,958,543 | 5/1976 | Senda | 123/148 E |

Primary Examiner—Charles T. Jordan
Attorney, Agent, or Firm—Kenyon & Kenyon

[57] ABSTRACT

An improved spark advance circuit for use in an electronic ignition system for an internal combustion engine in which pulses generated in a pickup synchronized with the engine crankshaft are fed to a circuit for generating a voltage proportional to the desired advance and to a phase locked loop which is adapted to generate, at its output, a ramp synchronized with the input pulses, with the ramp output and proportional voltage supplied to a comparator, the output of which generates firing pulses which are advanced as a function of engine operation for use in the electronic ignition system.

43 Claims, 5 Drawing Figures

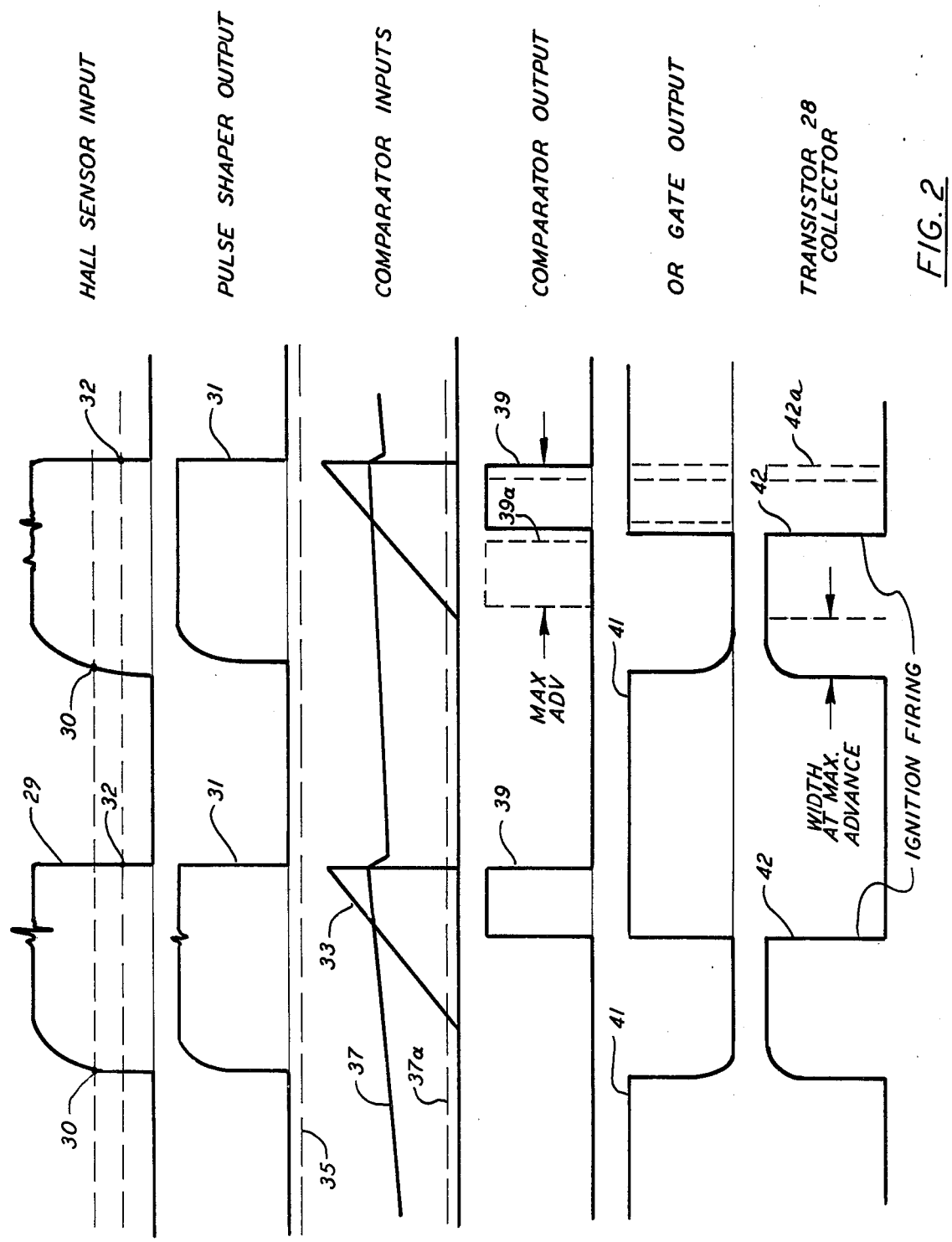

ELECTRONIC IGNITION ADVANCE CIRCUIT

BACKGROUND OF INVENTION

This invention relates to electronic ignition systems in general and more particularly to an improved circuit for obtaining spark advance in an electronic ignition system.

With the availability of better electronic components, particularly power semiconductors, electronic ignition systems replacing the old mechanical system have come into wide spread use in automobile ignition systems. Although the prior art "Kettering" system which has been used for many years works quite well, it relies on ignition points which must switch high currents. As a result, over a period of time, the points become burned. In addition, the points ride on a cam in the distributor and wear takes place changing the point gap as time goes by. As a result in order to maintain proper engine operation to maximize efficiency and minimize the emission of pollutants, periodic readjustment and replacement of the points is necessary.

Some of the earlier electronic ignition systems still used points but instead of switching the large currents necessary used the points to control semiconductor circuits which then switch the higher currents. This avoided the problem of point wear but did not overcome the problem of wear against the cam. Thus, points still needed periodic adjustment.

Present electronic ignition systems completely overcome the problems with points through the use of magnetic, photoelectric, or Hall effect pickup units in the distributor. Typical devices of this nature are disclosed for example in U.S. Pat. Nos. 3,749,974, and 3,923,030. Other systems propose utilizing crankshaft detectors. For example see U.S. Pat. Nos. 3,587,552 and 3,882,835.

There are basically two types of electronic ignition systems now is use. These are the inductive discharge system and the capacitive discharge system. The former operates much like the old "Kettering" type ignition system in that the current is switched in the primary of a coil with the secondary of the coil then providing the energy for firing the spark. The difference between the electronic ignition systems and old "Kettering" system is that rather than switching the primary through points, switching is done through semiconductors. In the capacitive discharge system the battery voltage is converted to a high voltage and this high voltage is used to charge up a capacitor which is then discharged at the firing instant.

Prior art distributors have built into them advance mechanisms which may be either or both a centrifugal and/or vacuum advance. Many electronic ignition systems utilize the prior art advance mechanism in the distributor and simply use the electronic circuits to control or supply the firing energy for the spark plugs. Although the present advance mechanisms in distributors are well developed, they are subject to wear and mechanical failure. More significantly there are limits on the types of advance curves which can be implemented and the ability to make changes in the advance curve. Thus, there have been attempts to develop electronic advanced circuits. Typical of such a circuit is that disclosed in U.S. Pat. No. 3,943,896. In the device disclosed therein, the input frequency from the distributor is converted to a voltage and that voltage used to control the timing of a monostable multivibrator, with the multivibrator then determining the firing instant. It will be recognized that such a circuit, relying as it does on an RC timing circuit in a monostable multivibrator, is difficult to control as to maximum advance. For example, the disclosed circuit relies on the points to establish maximum advance. Also, it is difficult to obtain non-linear curves and to change advance characteristics. Thus, because of these various problems many automobile manufacturers have not incorporated electronic advance into their electronic ignition systems.

Another attempt at the solution to this problem is the system disclosed in U.S. Pat. No. 3,882,835. In the device disclosed therein, outputs from a crankshaft detector feed a monostable circuit and a ramp generator. The monostable output provides inputs to a frequency to voltage generator and the ramp generator. The voltage to frequency converter generates a voltage which decreases proportionately with the frequency of the input pulse rate. The voltage to frequency converter output and ramp generator output are compared in a comparator to determine the advance firing point. In the ramp generator, another frequency to voltage converter is used to control the charge rate of the ramp generator in an attempt to achieve a ramp with nearly constant duty cycle and amplitude. The frequency to voltage converter operates by turning on an active current source for the duration of the monostable pulse.

Although in principle this system works well overcoming some of the deficiencies of the systems using variable monostable multivibrators, it too suffers from drawbacks. In the first place, it requires a relatively large number of components. More importantly, the use of a frequency to voltage converter to generate the ramp means that proper adjustment of this converter must be maintained at all times. The manner in which the frequency to voltage converter operates, relying on the monostable output to turn on an active current source can also lead to errors.

In view of these difficulties, the need for an improved advance circuit for use in electronic ignition circuits becomes evident.

SUMMARY OF THE INVENTION

The present invention fills this need. It provides an electronic advance circuit usable with either an inductive or capacitive discharge electronic ignition system. Essentially, the circuit comprises means to generate a voltage which depends on engine parameters such as speed and vacuum, a phase locked loop and a comparator. In the simplest case where only centrifugal advance is provided, the means to generate a voltage comprises a frequency to voltage converter. The phase locked loop and frequency to voltage converter are fed with the input pulses from a pickup, preferably after shaping, and the output of the phase locked loop and frequency to voltage converter compared in the comparator, the output of which is a modified pulse advanced to the desired degree. This pulse is then fed to the remainder of the electronic ignition system and indicates the point at which firing is to take place.

The phase locked loop which includes a phase comparator, filter and voltage controlled oscillator generates a ramp output the falling edge of which is synchronized with the falling edge of the input pulse. The frequency to voltage converter output, which is a negative voltage, is summed with a positive offset, the sum voltage being the comparator input. When the ramp voltage rises to the level of the sum of the frequency to voltage converter output and the offset voltage, its output changes from zero to a positive level, this pulse then being the advanced firing pulse.

Because of the offset voltage, at lower speeds the voltage controlled oscillator ramp voltage will never intercept the sum voltage. This is desired since at low speeds no advance is required. Thus, the input pulse after shaping and the output of the comparator are both coupled through an OR gate. As a result, at low speeds firing takes place at the time of the falling edge of the input pulse from the pickup. As speed increases, however, and the voltage output of the frequency to voltage converter becomes larger, an intersection of the ramp voltage and the sum voltage takes place and the firing point is advanced as a function of speed. Associated with the frequency to voltage converter is a limiter to establish a maximum advance.

Where vacuum advance is also desired, the output of a vacuum transducer is added to the frequency to voltage converter output to establish a voltage proportional to desired advance.

The basic circuit is implemented utilizing state of the art COS/MOS semiconductor microcircuits.

By using a phase locked loop, the ramp duty cycle and amplitude is controlled directly. In other words, the parameters are established either by passive components, or by the almost equally temperature independent COS/MOS gate threshold in the device used. A capacitive ratio establishes the duty cycle with the gate thresholds establishing ramp amplitude. Also the benefit of closed loop synchronization as opposed to the open loop operation of the prior art circuit is obtained.

A frequency to voltage converter utilizing a true "charge pump" is used in the present invention. The quantum of charge is determined by passive components rather than an active current source.

The use of passive components and COS/MOS devices permits maintaining a frequency to voltage converter output and ramp amplitude which is in an exact ratio over a range of supply voltages, making timing independent of voltage over that range. This combination also results in temperature independence. In addition utilizing a COS/MOS output stage allows stable limiting to establish a maximum angle of advance.

BRIEF DESCRIPTION OF THE DRAWING

FIG. 2 is a timing diagram helpful in understanding the operation of the circuit of FIG. 1.

DETAILED DESCRIPTION OF THE PRESENT INVENTION

Figure 1A:
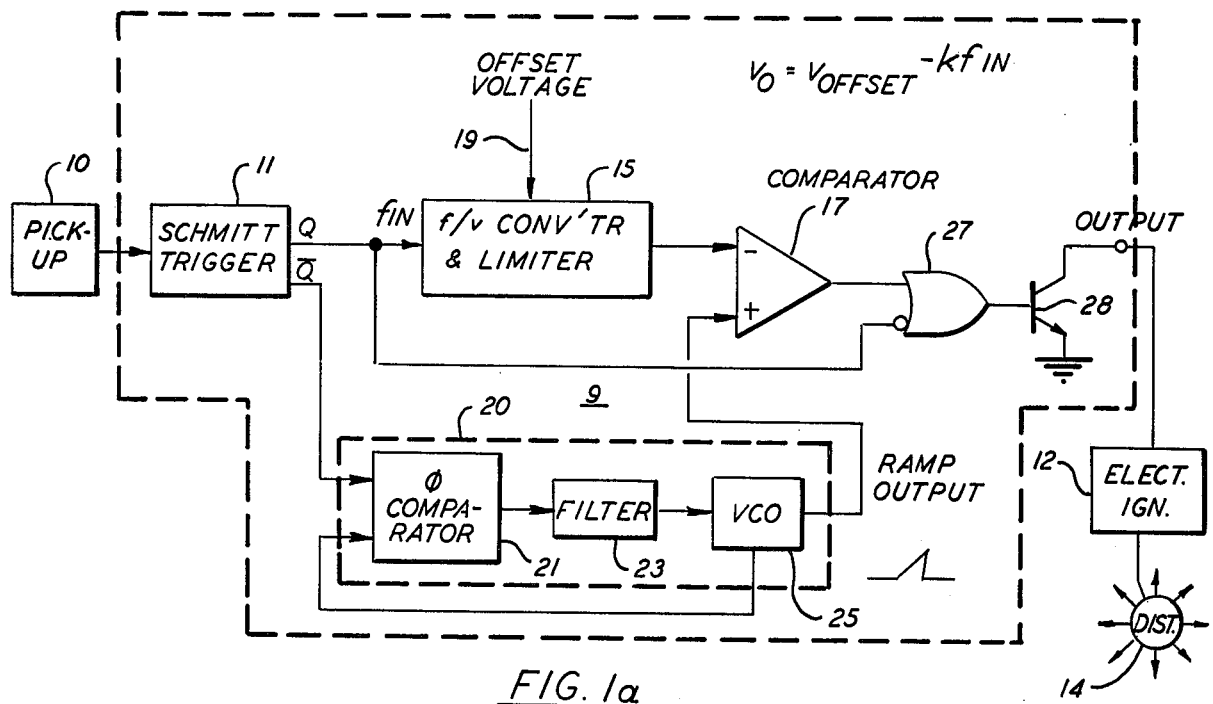
FIG. 1a is a block diagram of the advance circuit of the present invention employing only centrifugal advance.

FIG. 1a illustrates a first embodiment of the electronic advance circuit of the present invention along with the portions of an electronic ignition system with which it interfaces. The electronic advance circuit 9 obtains its input from a pickup 10. This may be a distributor pickup or a crankshaft pickup. If a distributor pickup, it may be any one of a number of well known pickup devices. It could, for example, be simply breaker points although it is preferred that a Hall sensor, magnetic sensor or photoelectric sensor be used. The output of the electronic advance circuit is provided to an electronic ignition system 12 which, in conventional fashion, supplies pulses to the distributor 14 which couples these pulses to the various spark plugs. Thus, in essence, the electronic advance circuit 9 of the present invention is a circuit to be interposed between a pickup and a conventional electronic ignition system of the type which previously obtained the necessary advance from mechanisms in the distributor. Of course, since the electronic advance circuit is provided, the distributor will be one without any advance mechanisms i.e., its output shaft will be coupled directly to the engine camshaft.

The electronic advance circuit of the present invention includes at its input a pulse shaper 11 which will sharpen the pulse from the pickup. An uninverted output Q of the pulse shaper 11 is provided as an input to a frequency to voltage converter 15 which converts the frequency input $f_{in}$ into a voltage equal to $-kf_{in}$, k being a constant of proportionality. Converter 15 includes a limiter stage to be described below. The output of convertor 15 is coupled to the inverting input of a comparator 17. Also provided as an input to the converter 15 is a positive offset voltage on line 19. This voltage is added to the voltage $-kf_{in}$ to obtain $V_o = V_{offset} - kf_{in}$. The inverted output Q of pulse shaper 11 is provided as an input to a phase locked loop 20 made up of a phase comparator 21, a filter 23 and a voltage controlled oscillator 25 adapted to provide a ramp output voltage. In conventional fashion, feedback is provided from the voltage controlled oscillator 25 to the phase comparator 21 so as to cause the output of the voltage controlled oscillator 25 to be phase locked to the input pulses. The output of the voltage controlled oscillator is coupled to the input of the comparator 17. The output of the comparator 17 and the frequency input $f_{in}$ from the Q output of pulse shaper 11 are the two inputs to an OR gate 27 at the output of which the final circuit output is provided through a transistor 28. OR gate 27 has an inverted input to which the input $f_{in}$ is coupled. The input from the pulse shaper 11 to OR gate 27 is thereby inverted.

Figure 1B:
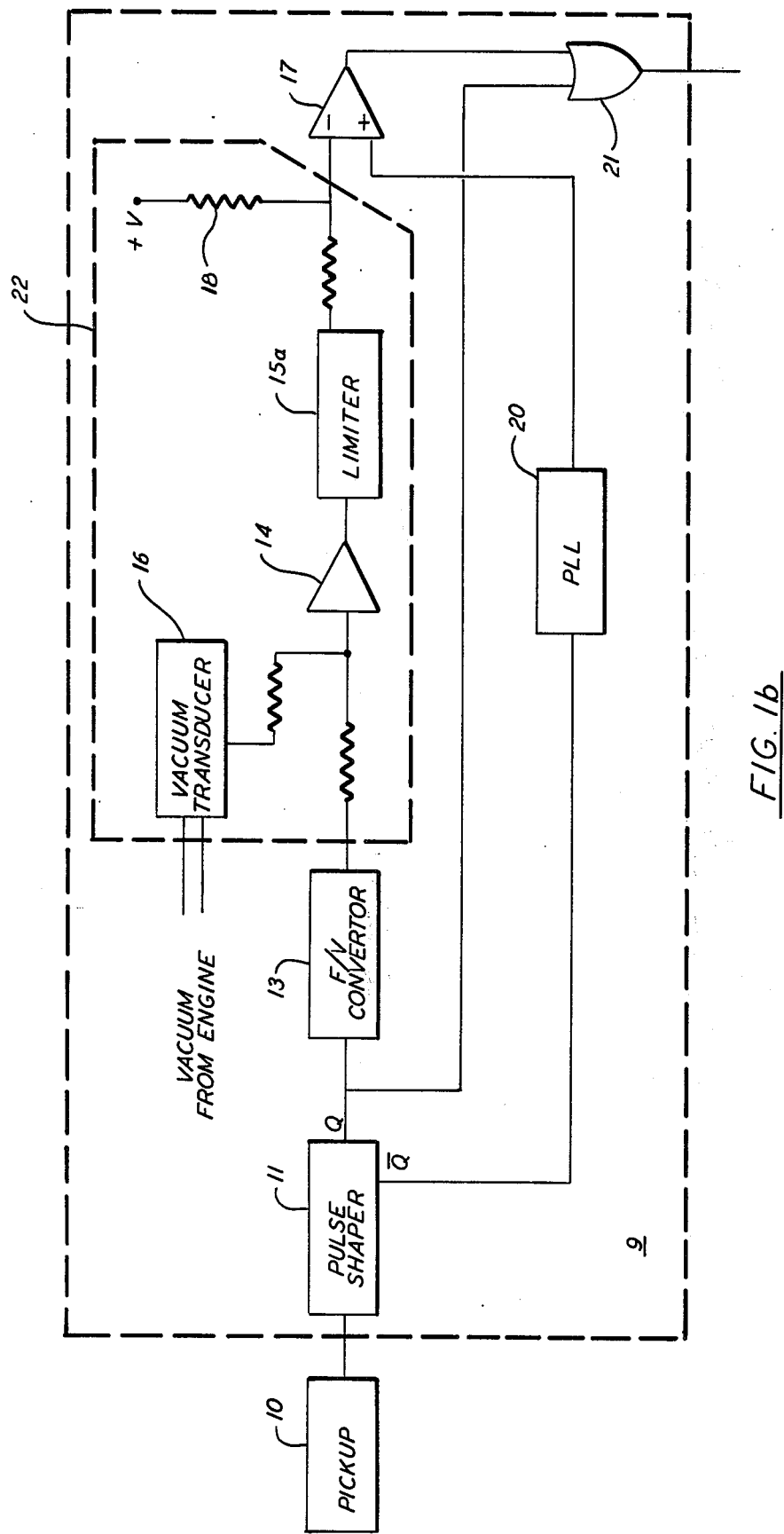
FIG. 1b is a similar diagram of an advance circuit employing both centrifugal and vacuum advance.

FIG. 1b is a modification of the circuit of FIG. 1a. It permits vacuum advance to also be established electronically. Interposed between converter 13 and a separate limiter 15a is a summing amplifier 14 having as a second input the output of a vacuum transducer 16 obtaining as an input engine vacuum. In this circuit the offset input is added at comparator 17 with a resistor 18. This is simply to show an alternative to adding in the converter. The portion of the circuit within block 22 including the transducer 16, limiter 15a, amplifier 14 and offset resistor 18 comprises means to establish a voltage which is proportional to desired advance as a function of engine operating parameters.

Operation of the circuit of FIG. 1a can best be understood with reference to FIG. 2. At the top thereof are shown the input pulses 29 assumed to be from a Hall generator. These are shaped in pulse shaper 11 which is a Schmitt trigger having switching points 30 and 32 to obtain the pulses designated 31 which will be at a frequency proportional to engine speed. Next shown are the comparator inputs, i.e., the output 33 of the voltage controlled oscillator 25 and the output 37 of the frequency to voltage converter 15. As illustrated, the falling edge of the ramp voltage generated in the voltage controlled oscillator 25 is synchronized to the falling edge of the input pulses 31. This is because the inverted input pulses are provided to the phase locked loop 20. It is desired that firing be referred to the falling edge of the input pulse. The offset voltage 35, as illustrated, is a positive voltage. When summed with the negative voltage $-kf_{in}$ developed by the converter, the result is voltage level 37 ($V_o$). This is the second input to the comparator. This voltage 37 is the voltage proportional to the desired advance as a function of engine parameters, e.g. engine RPM. It can be seen that as the ramp rises and exceeds the level of the voltage 37, the output of comparator 17 changes to generate a pulse 39. The rising edge of this pulse is advanced with respect to the falling edge of the pulse 31 by an amount that depends on speed, i.e., the greater the frequency, the larger the negative voltage $-kf_{in}$ and the lower will be the voltage 37 so that the ramp will intercept it earlier and earlier as speed increases. (If vacuum advance were included, the voltage 37 would reflect this and the extent of the advance would depend on both speed and vacuum).

Next is shown the output of the OR circuit 27 designated as pulses 41. The rising edges of these pulses indicate the firing instant. The OR circuit has as inputs the input voltage pulses 31 which are inverted through its inverting input and the comparator output pulses 39. Each output pulse 41 will be present from the beginning of the comparator output until the beginning of an input pulse 31. These pulses 41 are inverted through transistor 28 to give the final output pulses 42, the falling edges of which indicate the firing point. At low speeds, the voltage 37 will not be sufficiently low to intersect the ramp 33. Thus, at low speeds the firing instant will be determined by the falling edge of a pulse 31 inverted through the OR gate 27. The limiter in the converter 15 establishes a maximum advance by limiting the output of the frequency to voltage converter to a level 37a.

During periods of rapid deceleration the falling edge of the ramp 33 can lead the falling edges of a pulse 31. This could result in the pulse 39a shown in dotted lines on FIG. 2. This in turn could result in an erroneous firing pulse 42a. Compensation for this is provided, as will be described in connection with FIG. 3.

Figure 3:
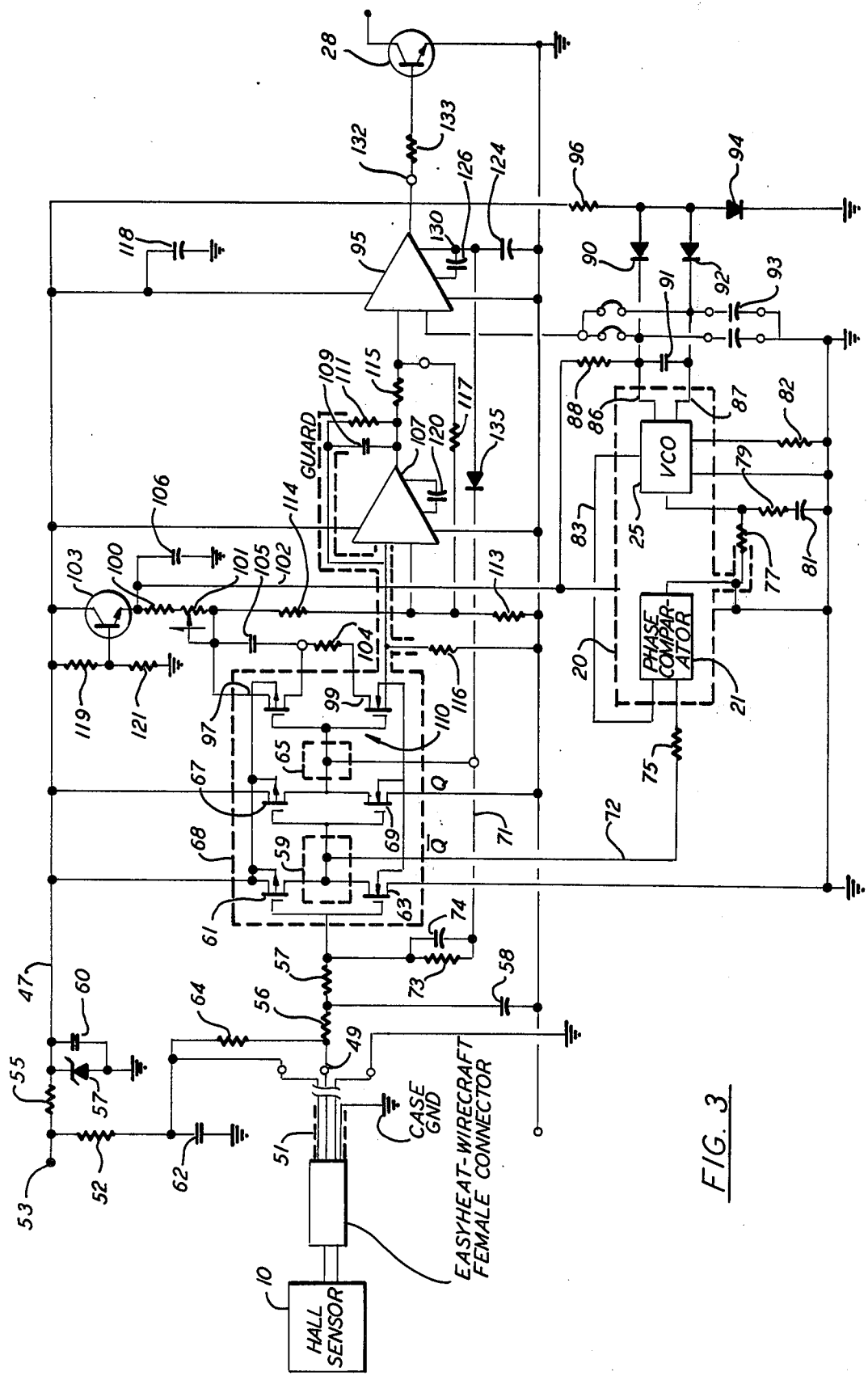
FIG. 3 is a detailed circuit diagram of the advance circuit of the present invention.

FIG. 3 illustrates a specific implementation of the circuit of FIG. 1. This circuit makes maximum use of COS/MOS circuitry for tolerance to temperature and supply voltage variations. It obtains an efficient combination of circuit functions in a few inexpensive integrated circuits and avoids temperature dependent semiconductor parameters such as diode or $V_{be}$ drops in critical circuit functions. It also minimizes setup adjustments. In the embodiment of FIG. 3 the pickup device is a Hall sensor 10 in a distributor. It receives an input voltage on line 51 from a battery terminal 53 through a resistor 52 and has an output on line 49. Resistor 52 along with capacitor 62 and resistor 64 are a pull-up circuit for the open collector of the Hall device coupled to line 49.

The 12 volt nominal battery voltage present at terminal 53 is also coupled through a resistor 55 and Zener diode 57 to establish a lower, regulated voltage for the advance circuit to avoid problems which might occur due to variations in battery voltage. Typically, the Zener diode 57 is an 8.2 volt Zener diode to establish an 8.2 volt positive bus 47.

The input on line 49 is coupled through a filtering input circuit comprising resistor 56 and capacitor 58 to a first CMOS inverter 59 including transistors 61 and 63. The output of this inverter is coupled to a second CMOS inverter 65 comprising transistors 67 and 69. As illustrated, the inverters are both connected across the positive bus 47 and ground. The output of the second inverter 65 on line 71 is fed back through a resistor 73 and speed up capacitor 74 to the input of the first inverter. In conjunction with resistor 57 this feedback causes the circuit to act as a Schmitt trigger. With the supply at about 8 volts, the trigger thresholds 30 and 32 shown on FIG. 2 are approximately 2.5 v and 5.5 v respectively. The output Q of the first inverter 59 on line 72 i.e., inverted input pulses, is coupled as an input to the phase locked loop 20. The phase locked loop is a commercially available microcircuit. The input is coupled through a current limiting resistor 75 since, as will be seen below, the phase locked loop operates at a supply voltage of about 5 volts. The microcircuit includes a phase comparator 21 and the voltage controlled oscillator 25. The output of the comparator is filtered using a lead-lag filter made up of resistors 77 and 79 and capacitor 81. The output of this filter is, as shown, the input to the voltage controlled oscillator 25. The output of the voltage controlled oscillator is coupled back to the input of the phase comparator 21 over line 83. A capacitor 91 is coupled across terminals 86 and 87 and a resistor 88 couples terminal 86 to the supply voltage on line 102. The nature of the output of the voltage controlled oscillator at terminals 86 and 87 is that these terminals are alternately charged to half the supply voltage of 5 volts on line 102 (obtained in a manner to be described below), as sensed by an internal comparator, controlled by a current source programmed by resistor 82 with the other terminal held grounded. As a result of the action at the output of the voltage controlled oscillator 25, alternating sawtooth waveforms will be provided at the terminals 86 and 87. An additional capacitor 93 is coupled between terminal 87 and ground. This capacitor is selected so as to obtain an asymmetric charging process so that, for 8 cylinder operation, the duration of the ramp at terminal 86 corresponds to approximately 16 degrees of the 45 degrees of distributor rotation between input pulses over a range of 250–6000 distributor RPM. The phase locked loop has an output pulse on line 83 whose two edges are defined by the falling edges of the ramps at terminals 86 and 87. The falling edge of the ramp at terminal 86 is synchronized with the rising edge of the input pulse on line 72. Since this is an inverted input pulse, synchronism with the falling edge of pulse 31 of FIG. 2 is thus achieved. Normally, without capacitor 93, the two ramps are symmetrical and the pulse on line 83 and each ramp last for one-half the period between pulses i.e., 45°/2 for an eight cylinder engine. Were capacitor 93 not used, each full ramp would represent 22.5°. Since maximum advance in this particular circuit is 14°, this would mean operating only over about ⅔ of the ramp and accuracy would suffer. By using capacitor 93 the unused ramp at terminal 87, which occurs first in time and establishes the rising edge of the pulse on line 83, is lengthened. Initially this will tend to lengthen the pulse on line 83. But the closed loop acts to resynchronize so that falling edge of the pulse occurs at the rising edge of the input pulse. Thus, the two ramps become asymmetric and the ramp at terminal 86, for example, represents 16° and that at terminal 87 represents 29°. In this way almost the full ramp is used in varying advance from 0 to 14 degrees. If vacuum advance is also included, adjustment or elimination of the capacitor 93 is necessary in order to provide a maximum advance consistent with the sum of centrifugal and vacuum advance.

A voltage divider comprising resistor 96 and diode 94 is coupled between the positive bus 47 and ground. Diodes 90 and 92 respectively couple terminals 86 and 87 to the junction of resistor 96 and diode 94. When the voltage of a ramp at terminal 86 or 87 reaches one-half the supply voltage e.g. 2.5 v, an internal comparator triggers, grounding that terminal. Normally the discharge current flows through diodes in the integrated circuit. However, the temperature dependence of these diodes cannot easily be temperature compensated. Thus diodes 90 and 92 are used to provide a discharge path. Temperature compensated bias is provided by identical diode 94. As a result the reference potential for the discharge of capacitor 91 is approximately ground, independent of temperature.

By using the phase locked loop ramp, the ramp always occupies a given fraction of the period. Thus, even as the ramp shortens with increasing speed, it still has the same amplitude and its width still corresponds to the same number of degrees of rotation. As a result any given ramp voltage will always correspond to the same advance angle. The phase locked loop will remain synchronized over an input range of between 250–300 distributor rpm to about 6000 distributor rpm. As will be seen below onset of advance occurs at about 500 rpm.

The ramp generator is almost completely temperature independent in peak amplitude for a given microcircuit. Device to device variations are approximately plus and minus ten percent of peak amplitude. Compensation for such is achieved in a manner to be described below. The ramp voltage thus generated, i.e., the ramp 33 of FIG. 2 is fed to the positive input of a high impedance operational amplifier 95. The critical amplitude of the ramp is established as a stable fraction, i.e., one-half, of the supply voltage. The supply voltage for the phase locked loop is supplied on line 102 from a separate supply comprising a voltage divider including resistors 119 and 121 and an emitter follower transistor 103. The ratio of resistors 119 and 121 is selected to establish a voltage of about 5 volts. A bypass capacitor 106 couples the emitter of transistor 103 to ground.

The parameters of the frequency to voltage conversion must also be scaled to the same supply voltage. If this is done, the timing shown on FIG. 2 becomes independent of supply voltage over the working range. In order to achieve this, the frequency voltage converter configuration used is one utilizing a "charge pump" with a fraction of the supply voltage used as the reference. The output of the inverter 65 is supplied to the gates of two complementary transistors 97 and 99. These are in a common integrated circuit 68 with inverters 59 and 65. These are connected to serve as a single pole double throw switch 110 actuated by the input pulse. The source of the transistor 97 is coupled through a resistor 100 and potentiometer 101 to the reduced supply voltage on line 102. The drain of transistor 99 is coupled to the drain of transistor 97 through a resistor 104. A capacitor 105 ($C_1$) is coupled across transistor 97. The source of the transistor 99 is coupled to the negative input of an operational amplifier 107. Amplifier 107 has a capacitor 109 ($C_2$) in parallel with a resistor 111 in its negative feedback path ($R_{111}$). The positive input to the amplifier 107 is coupled to a voltage divider made up of resistor 113 ($R_{113}$) and resistor 114 ($R_{114}$). An output resistor 115 ($R_{115}$) and a resistor 117 ($R_{117}$) are coupled between the output and positive input. A resistor 116 ($R_{116}$) couples the negative input of the amplifier to ground. The designations in brackets correspond to those to be used in equations below.

Figure 4:
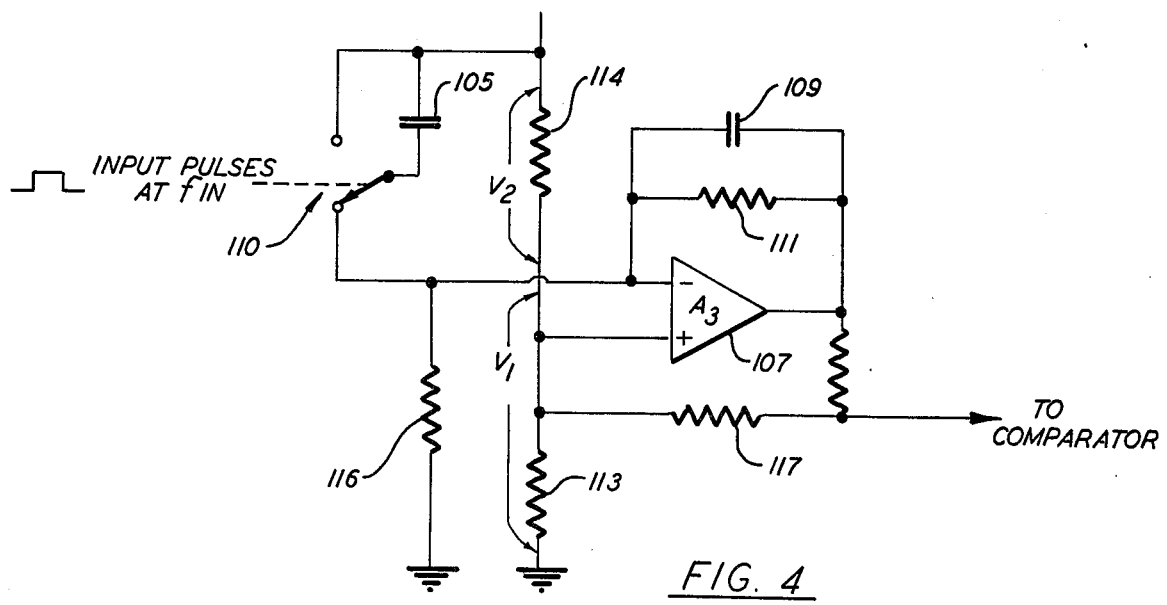
FIG. 4 is a simplified schematic of the frequency to voltage converter of FIG. 3.

FIG. 4 is a simplified schematic of the frequency to voltage converter. With a low input from inverter 65, the position of the switch 110 is opposite to that shown. This corresponds to transistor 97 being in the "ON" state. The capacitor 105 is discharged and held in that state. When the output of inverter 65 goes high, transistor 99 is turned on and transistor 97 turned off. The capacitor 105 designated C1 in the following equation, is charged through resistor 104 to the reference voltage $V_2$ across resistor 114. This is due to the fact that the nature of the operational amplifier is such as to maintain its input terminals at equal potential. At the end of each input pulse, the switch changes state, discharging the capacitor 105. With each input rising edge the switch returns to the position shown and the capacitor 105 is charged again, causing an amount of charge C1 $V_2$ to be transferred to the capacitor 109 ($C_2$) in the feedback path of the amplifier 107. The negative feedback around amplifier 107 maintains its two inputs at equal potential; the charging current for capacitor 105 also flows through capacitor 109 pumping an equal charge into capacitor 109. The pumping rate must equal the discharge rate established by resistor 111. For a given input frequency the equilibrium condition is as follows:
$f_{in}C_1V_2 = V_{C2}/R111$ Since the input terminals of the amplifier 107 are at equal potential because of the negative feedback, the output $V_o$ will be equal to:

$$V_o = V_1[a(1-b)+b] - \tau V_2(1-b)f_{in}$$

where
$V_1$ = voltage across resistor 113 ($R_{113}$)
$V_2$ = voltage across resistor 114 ($R_{114}$)
$a = (R_{116}+R_{111})/R_{116}$
$b = R_{115}/(R_{111}+R_{115})$
$\tau = R_{111}C_2$
and $R_{117} \gg R_{113}$ In the above equations the $V_1$ term is the offset and the $V_2$ term the frequency dependent term. This is precisely what is required since $V_1$ and $V_2$ are established as a fraction of the supply voltage on line 102. Although the MOS devices 97 and 99 have a finite "on" resistance, the charge and discharge time constants are fast compared to the time intervals defined by the input pulse. Thus, in this stage both the frequency to voltage conversion and the offset are carried out. Potentiometer 101 permits adjusting the voltage input to the converter to compensate for the device to device variations in the phase locked loops mentioned above.

Amplifier 107 and its associated circuitry also implements the limiting function. Amplifier 107 will preferably be of a type with a COS/MOS output stage. The output of this stage is such as to limit its output at the supply voltage input. The component values are chosen so that the output limits at ground at a predetermined distributor RPM. The voltage divider comprising the resistors 115, 117 and 113 establishes an effective limiter level at some positive voltage appropriate to the maximum advance angle desired. Since the voltages across resistors 114 and 113 (see FIG. 3) are derived from the same voltage divider, maximum advance is reached at a speed determined only by passive components, i.e., resistors 113, 114, 111, 116 and capacitor 105. Different combinations of resistors 116 and 111 define different advance onsets and slopes.

The actual maximum advance angle is determined by the duration of the ramp as a fraction of the total period (given by C13/(C12+C13)) and by the divider comprising resistors 115 and 117. Different values of resistor 115 program the maximum advance. A table below gives the maximum advance and RPM at onset for various component values.

| Curve | Distrib. RPM Start ±50 | Distrib. RPM Peak ±100 | Advance Deg. ±½ | R116 | R111 | R115 |
|---|---|---|---|---|---|---|
| 1 | 550 | 900 | 12 | 357k | 698k | 54.9k |
| 2 | 550 | 1400 | 12 | 357k | 267k | 54.9k |
| 3 | 550 | 2000 | 12 | 309k | 174k | 54.9k |
| 4 | 550 | 1400 | 14 | 357k | 267k | 31.6k |
| 5 | 550 | 900 | 14 | 357k | 698k | 31.6k |
| 6 | 550 | 2000 | 14 | 309k | 174k | 31.6k |

It should be noted that at low speeds the phase locked loop will not synchronize. However, synchronization occurs at about 250–300 distributor RPM, well below the 550 rpm where advance starts. Thus there is lack of synchronization only where firing is still controlled directly by the input pulses 31 of FIG. 2.

Once the output of amplifier 107 saturates at ground, the advance angle should then stay constant at higher speeds. However, in practice the time constant of the input filter made up of resistor 56 and capacitor 58 introduces a small retard (approx. 1° @ 5000 RPM, distributor). Resistor 88 provides an approximate compensation for this retard. The current through resistor 88 provides a fixed addition to the C13 charging current for capacitor 91 during the half cycle which yields the ramp at terminal 86. A fixed additional charging current shortens the ramp by an amount dependent on speed. At high speeds the extra current constitutes a small contribution, with little effect on ramp duration. At lower speeds, the extra current shortens the ramp more. In effect resistor 88 introduces additional retard at lower speeds, compensating the retard of the filter at higher speeds.

The output through resistor 115 is provided as the negative input to amplifier 95 which, as noted above, has the output of the voltage controlled oscillator of terminal 85 at its positive input. This amplifier serves both as comparator and OR gate. Terminal 130 in the amplifier gives access to the driver stage. As illustrated, the terminal 130 is coupled through diode 135 to the output of the inverter stage 65. This input at terminal 130 acts as an inverting input, i.e., when a low voltage is present there will be a positive or high output on terminal 132. If the low voltage at the output of the inverter 65 (on line 71) appears on terminal 130 without the comparator output present, this will drive the output stage of the amplifier 95 to a high output and thus obtain an OR function. The output at terminal 132 is the output 41 of FIG. 2. As shown, it is coupled through transistor 28 with a resistor 133 in its base input circuit to obtain the pulses 42 of FIG. 2. The CMOS output stage of comparator amplifier 95 is short circuit stable indefinitely permitting the output to feed transistor 28 directly with about 8 ma available.

At low speeds, where no advance is needed, the voltage 37 of FIG. 2 from amplifier 107 is more positive than the ramp 33 peak voltage from the terminal 86. The internal circuitry of comparator 95 maintains a positive voltage at the output stage coupled to point 130. In that case the negative transition of a pulse 31 of FIG. 2 through diode 135 pulls point 130 low i.e., to ground to give an output pulse 41 of FIG. 2. At high speeds the internal circuitry accomplishes this with a pulse 39 which occurs before the negative going edge of a pulse 31.

As mentioned above, during periods of rapid engine deceleration, the phase of the negative ramp transition (pulse 33) slightly leads the phase of the negative Hall transitions (pulse 31). At speeds calling for advance, this would means that the inputs to the OR circuit are not contiguous. This "logic gap" would generate the spurious output trigger pulse 42. Slow-up capacitor 124 between terminal 130 and ground acts mainly on the positive transition of the voltage at terminal 130, during which the internal circuitry of amplifier 95 is providing less current. The logic gap is not long enough to allow point 130 to reach the voltage necessary to cause a transition at the output 132, and a a spurious output trigger pulse is avoided.

The positive transition delay caused by capacitor 124 requires that the Hall sensor low output duty-cycle be less than 50% or else the transistor 28 collector output may be too short for reliable triggering of a capacitive discharge ignition.

At lower battery voltages, the Zener diode 57 will no longer maintain overall operating voltage at 8.2 V nominal. This does not immediately affect timing, since all frequency to voltage converter circuit voltages and the ramp amplitude vary in proportion to their common supply voltage. With some timing error (approx. 1°–2°) the circuit will operate down to supply voltage in the 6–7 V range. Below this voltage the transistor 99 no longer has sufficient gate turn on potential and the charge pump action ceases. This makes the output of amplifier 95 revert to its offset value, disabling the advance if the circuit was operating in the advance speed range.

Unadvanced output from transistor 28 is available down to the 5 V supply range (i.e., for cold cranking).

As noted above, the Zener diode 57 establishes a positive supply of approximately 8 volts. In addition it protects the circuit from overvoltage transients.

Component values for the remaining elements of the circuit of FIG. 3 other than those given in the table for an eight cylinder engine are as follows.

| Resistors | Ohms |
|---|---|
| 55 | 33 |
| 52 | 100 |
| 64 | 470 |
| 56 | 75 |
| 57 | 6.8K |
| 73 | 18K |
| 88 | 1.62M |
| 119,104 | 4.7K |
| 121 | 12K |
| 101 | 500 |
| 114 | 274 |
| 113 | 1.13K |
| 100 | 274 |
| 96 | 3.3K |
| 117 | 100K |
| 74 | 10K |
| 77 | 182K |
| 79 | 47.5K |
| 82 | 33.2K |
| 133 | 1K |

| Capacitors | uf |

| | |
|---|---|
| 58, 60, 109, 81 | .22 |
| 62 | .1 |
| 74 | .0015 |
| 104, 118, 91 | .01 |
| 105 | .047 |
| 93 | .0033 |
| 120, 126 | 56pf |
| 124 | .0047 |

Phase Locked Loop - RCA CD4646AF
CMOS circuit 68 - RCA CD4007AF
Amplifiers 95, 109 - RCA CA3130
Transistor 28    MPS-A06

Capacitors 120 and 122 associated with amplifiers 107 and 95 prevent high frequency oscillations. Capacitor 118 acts to filter the positive bus 47. Other factors which aid in the proper performance of the circuit of the present invention are as follows:

(a) to achieve RC time constants of adequate duration without excessively large capacitors, impedances in the 100K–1 Meg range are part of the phase locked loop 20 and amplifier 107. Leakage on printed circuit surfaces should be kept low at worst-case temperatures by use of a conformal coat having a volume resistivity on the order of $10^{14}\Omega$-cm and which is uneffected by temperatures in the range of $-50°$ to $125°$ C. and humidity up to 100%, e.g., an epoxy having these characteristics, properly cured, prior to potting with other materials;

(b) In addition to the RCA phase locked loop and circuit 68 suggested, similar circuits made by others may be acceptable. The critical parameter for circuit 68 is the gate-threshold of the FETS used as the charge-pump switches. Gate-thresholds of other devices tested were too high. Some other B series CMOS phase locked loop circuits tested had higher transconductance devices in the VCO voltage programming circuit than those suggested. This changes loop gain, damping and minimum lock-up frequency for the phase locked loop. Possibly devices from other manufacturers could be used for the phase locked loop 20 subject to suitable changes in the values of resistors 82, 79, 77 and capacitor 81.

Thus, an improved electronic ignition advance circuit has been shown. Although a specific embodiment has been illustrated and described, it will be obvious to those skilled in the art that various modifications may be made without departing from the spirit of the invention which is intended to be limited solely by the appended claims.

What is claimed is:

1. In an internal combustion engine electronic ignition system which includes means for association with the engine having a timing pulse output representing crankshaft position and means for accepting said pulses and generating high voltage energy to be supplied to the spark plugs of the engine in response thereto, an electronic spark advance circuit comprising:
   (a) means for developing a voltage proportioned to a desired amount of advance having an input for coupling to the timing pulse output from the engine;
   (b) a phase locked loop including a phase comparator, a filter circuit and a voltage controlled oscillator having as inputs to its phase comparator a line adapted to be coupled to said timing pulse output, and the output of said voltage controlled oscillator, the output of said phase comparator coupled through said filter as the input to said voltage controlled oscillator, said phase locked loop thereby acting to adjust the output of said voltage controlled oscillator until the frequency thereof corresponds to the frequency of said timing pulse output, said phase locked loop delivering at its output a ramp voltage which is in phase with the input thereof; and
   (c) a comparator having its inputs coupled respectively to the output of said means for developing a voltage proportioned to a desired amount of advance, and the ramp voltage output of said phase locked loop and providing at its output pulses which are advanced with respect to the output pulses of the distributor as a function of said proportioned voltage, said output adapted to be coupled as the input to the means for generating high voltage energy.

2. Apparatus according to claim 1 wherein said means for developing a voltage porportioned to a desired amount of advance comprises a frequency to voltage converter having an input to be coupled to said timing pulse output for developing an output voltage proportional to engine speed.

3. Apparatus according to claim 2 and further including a vacuum transducer having an input for coupling to the vacuum manifold of the internal combustion engine for developing an output voltage proportional to engine vacuum and means to sum the output of said transducer and the output of said frequency to voltage converter to provide said voltage proportional to a desired amount of advance.

4. Apparatus according to claim 2 and further including:
   (a) a pulse shaper having its input adapted to be coupled to the timing pulse output and having its output coupled as the input to said frequency to voltage converter and said phase locked loop; and
   (b) an OR gate having as one input the output of said comparator and as a second input the output of said pulse shaper, the output of said OR gate adapted to be coupled to the means for generating high voltage energy.

5. Apparatus according to claim 4 and further including a means for limiting the output of said frequency to voltage converter for establishing the operative range of said circuit.

6. Apparatus according to claim 4 and further including means adding an offset voltage to the output of said frequency to voltage converter, said offset voltage establishing a voltage at which operation of said comparator begins.

7. Apparatus according to claim 1 wherein said means having a timing pulse output comprise a distributor.

8. Apparatus according to claim 7 wherein said distributor includes contact points for generating said timing pulse output.

9. Apparatus according to claim 7 wherein said distributor includes a Hall effect device for generating said timing pulse output.

10. Apparatus according to claim 7 wherein said distributor includes a magnetic pickup unit for generating said timing pulse output.

11. Apparatus according to claim 7 wherein said distributor includes a photoelectric pickup device for generating said timing pulse output.

12. Apparatus according to claim 1 wherein said means for generating high voltage energy comprise an electronic inductive discharge ignition system.

13. Apparatus according to claim 1 wherein said means for generating high voltage energy comprise an electronic capacitive discharge ignition system.

14. Apparatus according to claim 2 and further including an OR gate having one input coupled to the output of said comparator, and a second input adapted to be coupled to said timing pulse output, the output of said OR gate adapted to be coupled to the means for generating high voltage energy, whereby the first input received at said OR gate will be provided as an output thereby permitting operation of the engine to which said ignition system is attached despite a failure of the remainder of said circuit for any reason.

15. In an internal combustion engine electronic ignition system which includes means for association with the engine having a timing pulse output representing crankshaft position and means for accepting said pulses and generating high voltage energy to be supplied to the spark plugs of the engine in response thereto, an electronic spark advance circuit comprising:
(a) means for developing a voltage proportioned to a desired amount of advance having an input for coupling to the timing pulse output from the engine;
(b) a phase locked loop including a phase comparator, a filter circuit and a voltage controlled oscillator having as inputs to its phase comparator said timing pulse output, and the output of said voltage controlled oscillator, the output of said phase comparator coupled through said filter as the input to said voltage controlled oscillator, said phase locked loop thereby acting to adjust the output of said voltage controlled oscillator until the frequency thereof corresponds to the frequency of said timing pulse output, said phase locked loop delivering at its output a ramp voltage which is in phase with the input thereof; and
(c) a comparator having its inputs coupled respectively to the output of said means for developing a voltage proportioned to a desired amount of advance, and said ramp voltage output of said phase locked loop and providing at its output pulses which are advanced with respect to the output pulses of the distributor as a function of said proportioned voltage, said output adapted to be coupled as the input to the means for generating high voltage energy.

16. Apparatus according to claim 15 wherein said means for developing comprises a frequency to voltage converter having an input adapted to be coupled said source of input pulses for developing an output voltage proportional to its input pulse rate.

17. Apparatus according to claim 16 and further including a vacuum transducer having an input adapted for coupling to the vacuum manifold of an internal combustion engine for developing an output voltage proportional to the vacuum at its input and means to sum the output of said transducer and the output of said frequency to voltage converter to provide said voltage proportional to a desired amount of advance.

18. Apparatus according to claim 16 and further including:
(a) a pulse shaper having its input adapted to be coupled to the said input pulses and having its output coupled as the input to said frequency to voltage converter and said phase locked loop; and
(b) an OR gate having as one input the output of said comparator and as a second input the output of said pulse shaper, the output of said OR gate adapted to be coupled as the timing pulse input to the means for generating high voltage energy.

19. Apparatus according to claim 18 and further including a means for limiting the output of said frequency to voltage converter for establishing the operative range of said circuit.

20. Apparatus according to claim 18 and further including means adding an offset voltage to the output of said frequency to voltage converter, said offset voltage establishing a voltage at which operation of said comparator begins.

21. Apparatus according to claim 20 wherein said phase locked loop is a microcircuit CMOS device whereby the circuit is less sensitive voltage and temperature variations.

22. Apparatus according to claim 21 wherein said frequency to voltage converter comprises:
(a) an operational amplifier having a capacitor and resistor in parallel in its negative feed back path;
(b) a reference voltage supply;
(c) a single pole double throw switch having two switching terminals selectively couplable to a common terminal, said switch operatively coupled to the output of said means for pulse shaping having one switching terminal coupled to the inverting input of said amplifier and the other to said reference voltage supply;
(d) a capacitor having one terminal coupled to said reference supply voltage and the other to the common terminal of said switch;
(e) a first resistor between said reference supply voltage and the non-inverting input of said amplifier; and
(f) means coupling the non-inverting input of said amplifier to ground.

23. Apparatus according to claim 22 wherein said means coupling said non-inverting input to ground comprises a second resistor, said resistor thereby establishing an offset voltage.

24. Apparatus according to claim 23 and further including a third resistor between said inverting input and ground thereby establishing an additional offset voltage.

25. Apparatus according to claim 24 wherein said limiting means comprise a voltage divider in the output of said amplifier.

26. Apparatus according to claim 25 wherein said voltage divider is coupled to ground in series with said second resistor.

27. Apparatus according to claim 22 wherein said switch comprises a pair of complementary MOS transistors and said amplifier is a CMOS device.

28. Apparatus according to claim 27 wherein said pulse shaper comprises:
(a) first and second CMOS inverters in series; and
(b) a feedback resistor coupling the output of the second inverter to the input of the first, the input of the first inverter adapted to receive said input pulses.

29. Apparatus according to claim 28 wherein said advance circuit is to operate on the falling edge of said input pulses and wherein the output of said first inverter is coupled to the input of said phase locked loop and the output of said second inverter to said switch.

30. Apparatus according to claim 22 wherein said comparator comprises a second operational amplifier having the output of said first amplifier coupled to its inverting input and the output of said phase locked loop coupled to its non-inverting input, said amplifier having a CMOS output stage and wherein said OR circuit comprises a diode coupling said shaped timing pulses to said output stage.

31. Apparatus according to claim 15 wherein said phase locked loop includes an ouput stage having two terminals with a capacitor thereacross each, terminal alternately providing a ramp with the other terminal referenced to ground and further including an additional capacitor coupling one terminal to ground, the other terminal providing its output to said comparator, whereby the ramp on said other terminal can be made of a length corresponding to a desired maximum amount of dwell thereby permitting increased accuracy.

32. Apparatus according to claim 22 wherein said reference voltage supply is also provided as the reference voltage to said phase locked loop and further including a potentiometer between said reference supply and said frequency to voltage converter to adjust for device to device variations in the peak output ramp voltage of said phase locked loop.

33. Apparatus according to claim 15 wherein said circuit is adapted to be supplied with voltage and current from an automobile battery and further including a voltage regulating circuit for reducing battery voltage to a regulated level to avoid effects of transient voltage variations.

34. Apparatus according to claim 33 wherein said regulating circuit comprises a resistor and Zener diode in series between a battery voltage input terminal and ground voltage at the junction therebetween supplying said advance circuit.

35. Apparatus according to claim 16 and further including an OR gate having one input coupled to the output of said comparator, and a second input adapted to be coupled to the output of said timing pulse output, the output of said OR gate adapted to be coupled to the means for generating high voltage energy, whereby the first input received at said OR gate will be provided as an output thereby permitting operation of the engine to which said ignition system is attached despite a fialure of the remainder of said circuit for any reason.

36. Apparatus according to claim 27, wherein at least one of said transistors is selected so as to not have sufficient gate turn-on potential below a predetermined supply voltage thereby disabling the advance circuit from operating in the advanced speed range at low battery voltages at which point significant errors in said circuit could occur.

37. In an automotive electronic ignition system which is adapted to accept timing pulses from an engine pickup and includes means to generate from said timing pulses high energy firing pulses for spark plugs, a method of advancing the time of firing as a function of speed comprising:
 (a) generating a voltage proportional to a desired amount of advance;
 (b) generating a ramp voltage which has a falling edge phase locked to the rising edge of the timing pulses by steps comprising:
  (i) comparing, in a phase comparator, a pulse corresponding to said ramp voltage and said timing pulses;
  (ii) coupling the output of said phase comparator through a filter to a voltage controlled oscillator, developing at its output said ramp voltage and pulses synchronized therewith for feeding back to said phase comparator, whereby said ramp voltage will be phase locked, through a phase locked loop, to said timing pulses;
 (c) comparing the ramp voltage with the proportional voltage and providing a firing output to the means to generate whenever said ramp voltage is greater than said proportional voltage.

38. The method of claim 37 wherein said step of generating a proportional voltage comprises generating a voltage proportional to the frequency the timing pulses.

39. The method of claim 38 and further including the step of shaping said timing pulses prior to converting said pulses to a frequency.

40. The method according to claim 39 and further including the step of
 (a) generating an offset voltage having a polarity opposite to that of said frequency proportional voltage;
 (b) generating said ramp voltage so as to have a polarity the same as said offset voltage;
 (c) summing said offset voltage and frequency proportional voltage prior to comparison; and
 (d) providing as a firing output to said means for generating the first to occur of an edge of the shaped timing pulse from the engine and the output pulse obtained in said step of comparing, whereby a minimum frequency proportional voltage and thus a minimum speed will be established below which no advance will occur.

41. The method according to claim 40 and further including the step of limiting the output voltage of said frequency to voltage converter to thereby establish a maximum advance.

42. The method according to claim 37 wherein said step of generating a proportional voltage comprises generating a voltage proportional to engine speed plus engine vacuum.

43. The method according to claim 39 and further comprising providing as a firing output to said means for generating the first to occur of an edge of the shaped timing pulse from the engine and the output pulse obtained in said step of comparing.

* * * * *